Jan. 26, 1954

G. PETERSON 2,667,625

RADIO SEISMIC SYSTEM

Filed Aug. 24, 1948

INVENTOR.
GLEN PETERSON

BY Hudson & Young

ATTORNEYS

Jan. 26, 1954  G. PETERSON  2,667,625
RADIO SEISMIC SYSTEM
Filed Aug. 24, 1948  2 Sheets-Sheet 2

INVENTOR.
GLEN PETERSON
BY Hudson & Young
ATTORNEYS

Patented Jan. 26, 1954

2,667,625

UNITED STATES PATENT OFFICE 2,667,625

RADIO SEISMIC SYSTEM

Glen Peterson, Tulsa, Okla., assignor to Phillips Petroleum Company, a corporation of Delaware Application August 24, 1948, Serial No. 45,877

8 Claims. (Cl. 340—15)

1

This invention relates to a radio seismic system. In a more specific aspect it relates to a seismic system in which the outputs of predetermined groups of seismometers are combined and simultaneously recorded.

In seismic prospecting systems, a number of seismometers are arranged in a predetermined pattern and seismic waves produced by detonation of an explosive charge pass from the shot point to the seismometer units which produce electrical voltages representative of the seismic waves. These electrical voltages, after suitable amplification, are used to actuate a recorder and the resulting traces on the recording medium are analyzed to determine the nature and configuration of subterranean strata. Heretofore, the electrical voltages have been carried from the seismometers to the recording unit by a series of cables and these cables substantially limited the flexibility of the prospecting apparatus, particularly where rough or heavily wooded terrain was encountered. In my copending applications, Serial Nos. 41,337, 30,257, and 27,590, Patent Nos. 2,479,772, 2,494,830 and 2,557,310, respectively I have disclosed a complete radio seismic system in which the cables interconnecting the seismometers and recording unit are replaced by radio linkages. This greatly increases the flexibility of the seismic system and permits its use at locations where surveys by the cable connected apparatus are extremely difficult or impossible.

In any of the described seismic systems, it is oftentimes desirable that the outputs of two or more seismometers be combined and utilized to make a single trace on the recording medium. For example, the outputs of a rotational type seismometer and a translational type seismometer may be combined to eliminate the effects of Rayleigh or surface waves from the seismograph record. As another example, several adjacent seismometers may be interconnected and their outputs combined to eliminate local effects of surface strata upon the seismometer outputs. Again, two or more seismometers may be combined to produce desired directional effects so that it becomes possible to determine the direction of arrival of seismic waves. With cable connected systems, the portability requirements, the interaction of one circuit upon another, the creation of unknown time delays, and other factors have heretofore prevented extended and practical application of a multiplicity of combinations of seismometer outputs in a flexible arrangement.

I have discovered a simple and convenient

2 method and apparatus for combining the outputs of different seismometers as desired by application of the principles of the radio seismic system. The present invention contemplates placing a number of units, each consisting of a seismometer and a radio transmitter, in a predetermined pattern at the region to be surveyed. A multichannel receiver of novel design is utilized to pick up the signals of the respective radio transmitters, this receiver providing an output voltage proportional to the output of any single seismometer or of any desired combinations of said seismometers. The output of the receiver is then fed to a device which records the voltages represented by the predetermined combinations of seismometer outputs.

It is an object of the invention to provide a method of and apparatus for the mixing and selection of seismometer output voltages in one or more preselected combinations.

It is a further object of the invention to provide a system in which the output of any seismometer can be used several times simultaneously in each seismic problem.

It is a still further object of the invention to provide a system for simultaneously recording a multiplicity of different combinations of a group of seismometer signals.

It is a still further object of the invention to provide a completely flexible system of selecting and mixing seismic signals.

It is a still further object of the invention to provide a system which is reliable in operation, requires a minimum number of circuit components, and which is of rugged construction.

Various other objects, advantages and features of the invention will become apparent from the following detailed description taken in conjunction with the accompanying drawings, in which.

Figures 1, 2:
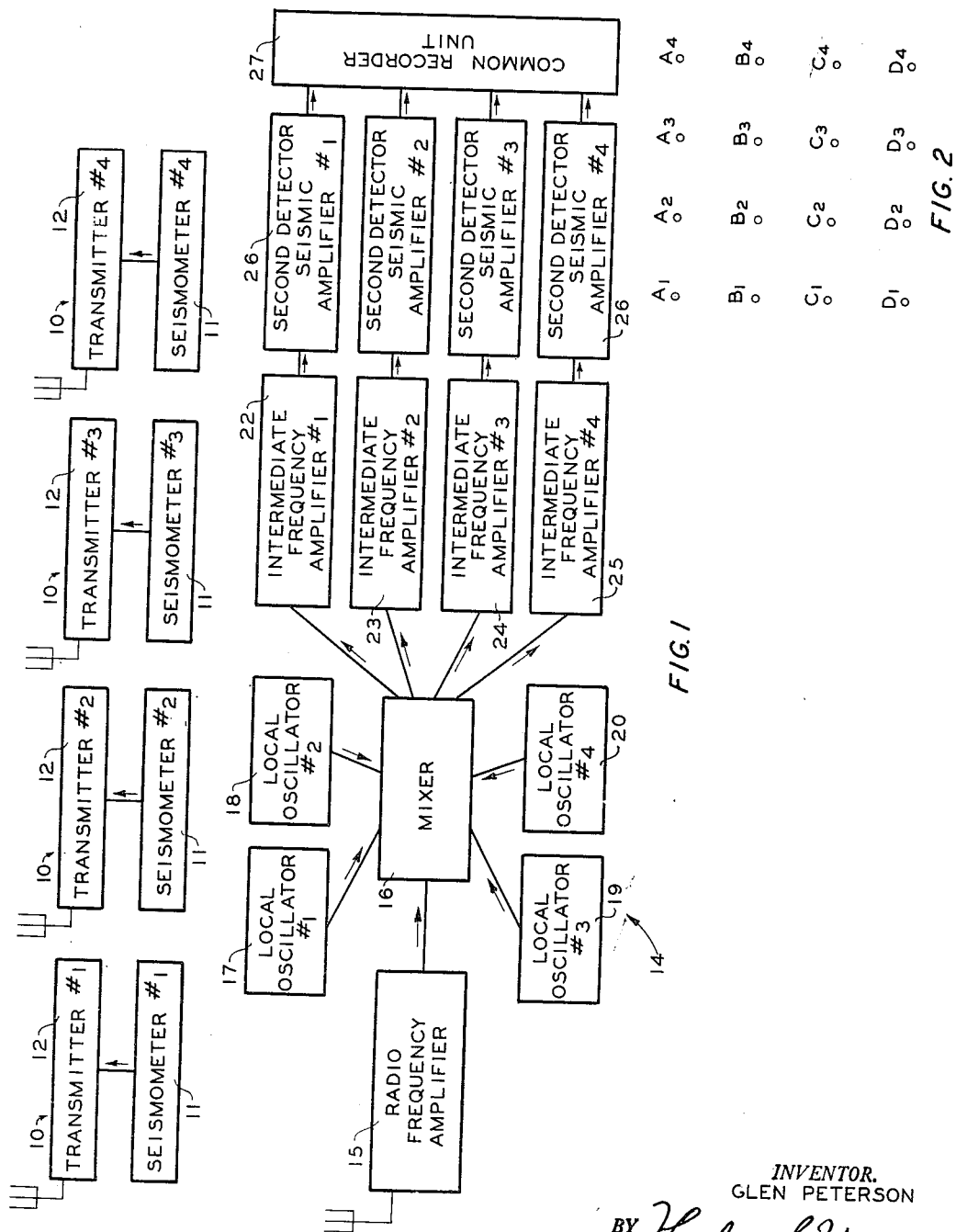
Figure 1 is a block diagram of the novel seismic system, with a number of the transmitter-seismometer units omitted for purposes of clarity.
Figure 2 is a schematic view of an array of seismometer-transmitter units.

Referring now to the drawings in detail, and particularly to Figure 1, the system includes a number of transmitter-seismometer units 10, each of which includes a seismometer 11 for converting seismic waves incident upon the seismometer into electrical voltages representative thereof. The voltages produced by each of the seismometers 11 are fed to a transmitter 12 associated therewith which radiates a radio wave modulated by the seismometer output voltage. Although four such units are shown in the drawing, it will be understood that any desired number may be used depending upon the nature and extent of the region to be surveyed. The radio waves produced by the transmitters 12 are all of different frequencies which, however, are quite close together in the frequency spectrum, due to governmental and practical requirements. Preferably and advantageously, there are equal frequency differences between adjoining waves in the frequency spectrum, and the various transmitter-seismometer units are disposed in a regular geometrical pattern. While many orderly geometric arrangements are possible; for example circular, rectangular and linear arrays, to name a few, a suitable arrangement for a system using sixteen seismometers is shown in Figure 2, in which it will be noted that there are four rows A, B, C, and D of seismometers with four seismometers 1, 2, 3, and 4 in each row. As a specific example, the frequencies of the respective transmitters may be as indicated in the following table:

*Table I*

TRANSMITTER FREQUENCIES IN MEGACYCLES

|   | 1 | 2 | 3 | 4 |
|---|---|---|---|---|
| A | 152.75 | 153.00 | 153.25 | 153.50 |
| B | 153.75 | 154.00 | 154.25 | 154.50 |
| C | 154.75 | 155.00 | 155.25 | 155.50 |
| D | 155.75 | 156.00 | 156.25 | 156.50 |

From the foregoing table, it will be noted that there is a frequency difference of .25 megacycle between adjoining transmitter frequencies and that all of the transmitters have different frequencies. Thus, for example, the frequency of transmitter A3 (153.25 megacycles) is .25 megacycle greater than the frequency of transmitter A2 (153.00 megacycles). Similarly, the frequency of transmitter D1 (155.75 megacycles) is .25 megacycle greater than the frequency of transmitter C4 (155.50 megacycles).

The signals from all transmitters are fed to a multi-channel receiver generally indicated by reference numeral 14, Figure 1. The input portion of this receiver includes a radio frequency amplifier 15 which amplifies all the incoming signals without separating them. From the amplifier 15, the signals are fed to a mixing circuit 16 wherein they are heterodyned with the output signals of a local oscillator unit, which may include one or more local oscillators 17, 18, 19, and 20. The resultant beat or heterodyne signals are fed from the mixing circuit to one or more intermediate frequency amplifiers 22, 23, 24, and 25, a preselected signal or group of signals being passed by the input circuits of each intermediate frequency amplifier. The signal from each intermediate frequency amplifier is fed to a second detector-seismic amplifier unit 26 and the output of each of the units 26 is fed to a common recorder unit 27.

In accordance with the invention, by varying the output frequency and number of local oscillators, I provide an array of input signals to the intermediate frequency amplifiers, and each of the intermediate frequency amplifiers is tuned so as to select a different predetermined combination of incoming signals which are amplified, rectified, and passed to the recorder.

Referring again to Table I and Figure 2, if it were desired to combine the output of all the seismometers in row A, for example, a single local oscillator 17 may be used which is tuned to a frequency of 147.00 megacycles. As a result, two heterodyne signals are produced for each incoming signal, one heterodyne signal having a frequency equal to the sum of the signal frequency and beat oscillator frequency, and the other heterodyne signal having a frequency equal to the difference between the local oscillator frequency and signal frequency. The difference frequencies are listed in the following table:

*Table II*

DIFFERENCE FREQUENCIES PRODUCED BY LOCAL OSCILLATOR FREQUENCY OF 147.00 MEGACYCLES

|   | 1 | 2 | 3 | 4 |
|---|---|---|---|---|
| A | 5.75 | 6.00 | 6.25 | 6.50 |
| B | 6.75 | 7.00 | 7.25 | 7.50 |
| C | 7.75 | 8.00 | 8.25 | 8.50 |
| D | 8.75 | 9.00 | 9.25 | 9.50 |

Assuming that intermediate frequency amplifier 22 is tuned to pass a frequency band of 5.75 to 6.50 megacycles, it will be apparent that the heterodyne signals representing the output of seismometers A1, A2, A3, and A4 will all enter the amplifier 22 while the remaining signals will be rejected. Accordingly, the signal passing into intermediate frequency amplifier 22 represents the combined output of the seismometers in row A and this combined output is recorded as a single trace by the unit 27. Similarly, if intermediate frequency amplifier 23 is tuned to a frequency of 6.75 to 7.50 megacycles, the output voltage thereof represents the combined output of the seismometers in row B and the combined voltage is recorded as another trace by unit 27. It will be apparent that various other combinations of seismometer outputs are possible by tuning the intermediate frequency amplifier units to preselected frequency ranges. For example, an intermediate frequency amplifier sharply tuned to a frequency of 8.50 megacycles will pick up only the output of seismometer C4. It will further be apparent that similar results may be achieved by using a smaller or larger number of seismometers and that the frequency of or frequency difference between the signals may be varied without changing the operation of the invention. However, as will be seen hereafter, it is desirable that the frequency differences between the transmitters be kept uniform.

In accordance with the invention, the combinations of preselected groups of seismometer signals may also be accomplished by providing a plurality of local oscillators whose frequencies are so chosen that a plurality of intermediate frequency signals of substantially the same wave length are produced in the mixing circuit, these signals representing the output of preselected groups of seismometers. In particular, assuming that there is an equal frequency difference between adjoining transmitter signals, and that a plurality of local oscillators are provided whose signals have a frequency difference which is an integral multiple of the frequency difference between adjoining transmitter signals, at each of several wave lengths there will be a group of signals from transmitters which are separated by a frequency difference equal to that between the local oscillator signals.

The foregoing manner of operation of the system may be better understood by consideration of another specific example utilizing a series of seismometer-transmitter units arranged as shown in Figure 2. In this example, the four local oscillators of Figure 1 are tuned, respectively, to frequencies of 147.00, 148.00, 149.00, and 150.00 megacycles while the transmitters are tuned to the frequencies listed in Table I. It will be noted that the frequency difference between the local oscillator signals (1.00 megacycle) is an integral multiple of the frequency difference between adjoining radio waves (.25 megacycle, Table I). The intermediate frequency difference signals produced by the interaction of the four local oscillator signals with the transmitter signals are as follows:

Table III

LOCAL OSCILLATOR FREQUENCY, 147.00 MEGACYCLES

|   | 1 | 2 | 3 | 4 |
|---|---|---|---|---|
| A | 5.75 | 6.00 | 6.25 | 6.50 |
| B | 6.75 | 7.00 | 7.25 | 7.50 |
| C | 7.75 | 8.00 | 8.25 | 8.50 |
| D | 8.75 | 9.00 | 9.25 | 9.50 |

LOCAL OSCILLATOR FREQUENCY, 148.00 MEGACYCLES

|   | 1 | 2 | 3 | 4 |
|---|---|---|---|---|
| A | 4.75 | 5.00 | 5.25 | 5.50 |
| B | 5.75 | 6.00 | 6.25 | 6.50 |
| C | 6.75 | 7.00 | 7.25 | 7.50 |
| D | 7.75 | 8.00 | 8.25 | 8.50 |

LOCAL OSCILLATOR FREQUENCY, 149.00 MEGACYCLES

|   | 1 | 2 | 3 | 4 |
|---|---|---|---|---|
| A | 3.75 | 4.00 | 4.25 | 4.50 |
| B | 4.75 | 5.00 | 5.25 | 5.50 |
| C | 5.75 | 6.00 | 6.25 | 6.50 |
| D | 6.75 | 7.00 | 7.25 | 7.50 |

LOCAL OSCILLATOR FREQUENCY, 150.00 MEGACYCLES

|   | 1 | 2 | 3 | 4 |
|---|---|---|---|---|
| A | 2.75 | 3.00 | 3.25 | 3.50 |
| B | 3.75 | 4.00 | 4.25 | 4.50 |
| C | 4.75 | 5.00 | 5.25 | 5.50 |
| D | 5.75 | 6.00 | 6.25 | 6.50 |

From the above table, it will be noted that the interaction of the 148.00 megacycle signal with the signal from transmitter C3, whose frequency is 155.25 megacycles, produces an intermediate frequency signal at 7.25 megacycles while, as another example, the 150.00 megacycle signal interacts with the output of transmitter A1, whose frequency is 152.75 megacycles, to produce an intermediate frequency signal at 2.75 megacycles.

It will be apparent that an intermediate frequency amplifier tuned sharply to a frequency of 5.75 megacycles will pick up the combined outputs of transmitters A1, B1, C1, and D1, that is, the transmitters of the first column, Figure 2, since an intermediate frequency signal of 5.75 megacycles is produced by the interaction of each of these transmitter frequencies with one of the local oscillator frequencies. Similarly, an intermediate frequency amplifier sharply tuned to a frequency of 6.50 megacycles will pick up the combined output of all the transmitters in the fourth column, Figure 2, that is, transmitters A4, B4, C4, and D4. Similarly, the output from the transmitters in the second and third columns may be combined by providing intermediate frequency amplifiers sharply tuned to frequencies of 6.00 and 6.25 megacycles, respectively. Alternatively, the output of various other groups of transmitters may be combined. For example, an intermediate frequency amplifier sharply tuned to a frequency of 4.25 megacycles will pick up the combined output of transmitters A3 and B3. As another example, an intermediate frequency amplifier tuned to the range of 7.75 to 8.00 megacycles will pick up the combined output of transmitters C1, C2, D1, and D2.

It will be understood, however, that the frequency differences between the signals need not necessarily be equal nor is it necessary that there be equal frequency differences between the local oscillator frequencies, in order to obtain certain of the results of the present invention.

In seismic exploration, it is oftentimes very desirable that the signals be picked up in groups of two, particularly where the output of a translational geophone is to be combined with the output of a rotational geophone to eliminate the effects of surface waves. In accordance with the invention, the transmitter and local oscillator frequencies may be readily chosen to pick up the signals in groups of two. If there are equal frequency differences between the transmitter signals, this may be done by utilizing two local oscillators having a frequency difference equal to the frequency difference between adjoining transmitter signals. In the specific example of Figure 2, this result may be obtained by utilizing two local oscillators tuned to frequencies of 147.00 and 147.25 megacycles. The resulting intermediate signal frequencies are shown by Table IV:

Table IV

BEAT OSCILLATOR FREQUENCY, 147.00 MEGACYCLES

|   | 1 | 2 | 3 | 4 |
|---|---|---|---|---|
| A | 5.75 | 6.00 | 6.25 | 6.50 |
| B | 6.75 | 7.00 | 7.25 | 7.50 |
| C | 7.75 | 8.00 | 8.25 | 8.50 |
| D | 8.75 | 9.00 | 9.25 | 9.50 |

BEAT OSCILLATOR FREQUENCY, 147.25 MEGACYCLES

|   | 1 | 2 | 3 | 4 |
|---|---|---|---|---|
| A | 5.50 | 5.75 | 6.00 | 6.25 |
| B | 6.50 | 6.75 | 7.00 | 7.25 |
| C | 7.50 | 7.75 | 8.00 | 8.25 |
| D | 8.50 | 8.75 | 9.00 | 9.25 |

From the foregoing table, it will be apparent that the transmitter signals may be readily combined in groups of two. For example, an intermediate frequency amplifier tuned to 5.75 megacycles will pick up the combined outputs of transmitters A1 (Table IV, top portion) and A2 (Table IV, bottom portion). An intermediate frequency amplifier sharply tuned to 8.50 megacycles will pick up the combined outputs of transmitters C4 (Table IV, top portion) and D1 (Table IV, bottom portion). It will further be apparent that combined signals of any two adjoining transmitters may be readily chosen by properly tuning one of the intermediate frequency amplifiers. Further, several groups may be selected at one time and their respective combined signals may be recorded by the unit 21 by providing a separate detector and amplifier unit for each intermediate frequency amplifier. Also, in connection with Table IV, it will be noted that an intermediate frequency amplifier tuned to pass frequencies of 6.00 to 6.30 megacycles, for example, will pick up the combined output of seismometers A2, A3 (Table IV, top portion), and A4, and B1 (Table IV, bottom portion). Various other groups may obviously be chosen by suitable selection of the intermediate frequency band pass ranges.

Various other combinations of local oscillator and transmitter frequencies will be apparent to those skilled in the art. Assuming that it were desired to pick up the combined signal of the transmitter-seismometer units along a diagonal of Figure 2, local oscillator frequencies may be selected as shown in Table V:

*Table V*

| Seismometer | Signal Frequency | Local Oscillator Frequency | Intermediate Frequency |
|---|---|---|---|
| A1 | 152.75 | 147.00 | 5.75 |
| B2 | 154.00 | 148.25 | 5.75 |
| C3 | 155.25 | 149.50 | 5.75 |
| D4 | 156.50 | 150.75 | 5.75 |

From this table it will be observed that each of the transmitters along the major diagonal produces an intermediate frequency signal at 5.75 megacycles by interaction with one of the local oscillator signals. These signals may then be picked up as a group by an intermediate frequency amplifier sharply tuned to a frequency of 5.75 megacycles. Similarly, by making the proper choice of transmitter frequencies, local oscillator frequencies, and intermediate frequency tuning, any desired combination of transmitter outputs may be provided for each of the intermediate frequency amplifiers 22. In addition, any desired number of intermediate frequency amplifiers may be used and the outputs of as many groups as desired may be simultaneously recorded by the unit 27.

Referring again to Figure 1, the circuit elements of the combination are all of conventional construction with the exception of mixing circuit 16 and the features claimed in my aforesaid copending applications, Serial Nos. 41,337, 30,257, and 27,590, now Patent Nos. 2,479,772, 2,494,830, and 2,557,310 respectively. However, insofar as I am aware, the disclosed combination of elements is new. Hence, the conventional elements themselves need not be described in detail. Two suitable embodiments of the mixing circuit 16 are shown in Figures 3 and 4.

Figure 3:
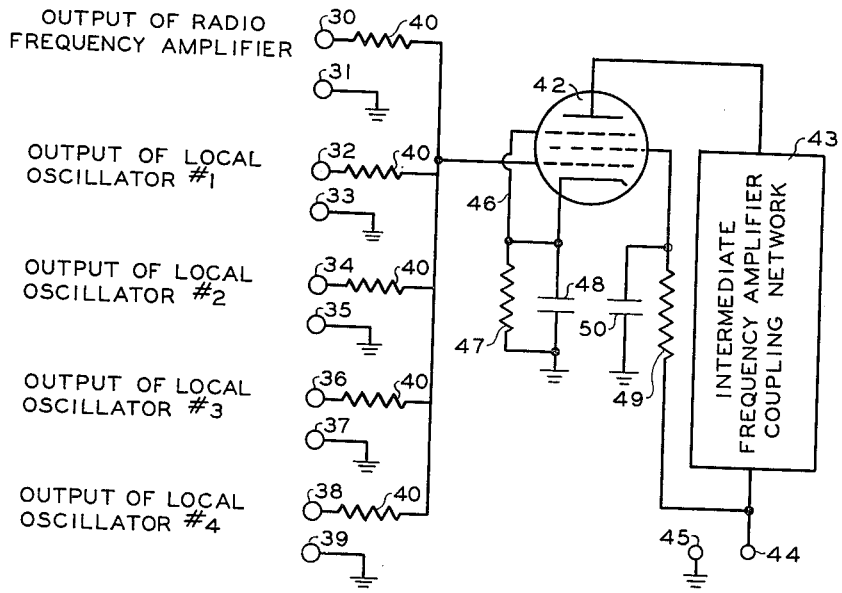
Figure 3 is a schematic circuit diagram of a mixing circuit used in the receiver of Figure 1.

Referring to Figure 3, a set of input terminals 30, 31 is provided for receiving the output of radio frequency amplifier 15, and four sets 32 and 33, 34 and 35, 36 and 37, 38 and 39, of input terminals are provided for receiving the outputs of the respective local oscillators 17, 18, 19, and 20. Terminals 31, 33, 35, 37, and 39 are grounded while each of the other terminals is connected through a separate decoupling impedance 40 to a common conductor. This conductor is connected to the control grid of a pentode 42, the anode of which is connected through an intermediate frequency amplifier coupling network 43 to a positive terminal 44 of a suitable power source, the negative terminal 45 of which is grounded. The intermediate frequency coupling network is preferably similar to that disclosed in my copending application Serial No. 41,337, now Patent No. 2,479,772 and effectively prevents interference between the different signals or groups of signals picked up by the respective intermediate frequency amplifiers 22, 23, 24, and 25. The suppressor grid of tube 42 is connected by a lead 46 to the cathode thereof, and the cathode, in turn, is connected to ground through a resistor 47 which is by-passed by a condenser 48. The screen grid of tube 42 is connected through a resistor 49 to positive terminal 44 and the screen grid is also grounded by a filter condenser 50. Signals appearing across the respective sets of input terminals are mixed by the disclosed circuit and produce groups of intermediate frequency signals, as described in connection with the specific example of Figure 2. Desired individual signals or groups thereof are selected by the tuned intermediate frequency input circuits connected in the anode circuit of tube 42 through coupling network 43.

Figure 4:
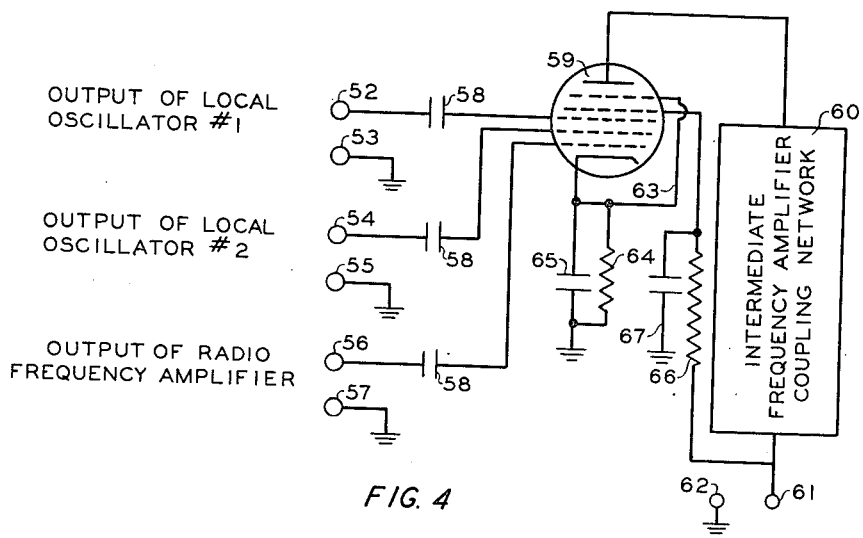
Figure 4 is a schematic circuit diagram of a modified mixing circuit.

In Figure 4, I have shown a suitable mixing circuit for use with two local oscillators. The output of the first local oscillator is fed to terminals 52 and 53, the output of the second local oscillator is fed to terminals 54 and 55, while the output of the radio frequency amplifier 15 is fed to terminals 56 and 57. Terminals 53, 55 and 57 are grounded while the other terminals are connected through the respective coupling condensers 58 to the first, second and third grids of a pentagrid converter tube 59. The anode of tube 59 is connected through an intermediate frequency amplifier coupling network 60 to a positive terminal 61 of a suitable power supply, the negative terminal 62 of which is grounded. The suppressor grid of tube 59 is connected to the cathode thereof by a lead 63 and the cathode, in turn, is connected to ground through a resistor 64 which is shunted by a filter condenser 65. The screen grid of tube 59 is connected through a resistor 66 to terminal 61 and a filter condenser 67 is provided for grounding the screen grid. The operation of the circuit of Figure 4 is similar to that of Figure 3 except that the signals are mixed by control of the electron current flowing through tube 59 rather than by being interconnected at a common conductor, as in the circuit of Figure 3.

It will be apparent that I have described a system for providing signals of different frequencies corresponding to the outputs of a group of seismometers and that I have disclosed means for selecting any desired groups of these signals and recording them separately to provide indications of the combined seismometer outputs. This provides a flexible and highly versatile mixing system and many useful functions can now be obtained which have not heretofore been possible.

While the invention has been described in connection with a present, preferred embodiment thereof, it is to be understood that this description is illustrative only and is not intended to limit the invention, the scope of which is defined by the appended claims.

Having described my invention, I claim:

1. In a radio seismic system, a plurality of seismometers for converting seismic waves into electrical voltages representative thereof, a plurality of transmitters connected to the respective seismometers to radiate radio waves modulated by said electrical voltages, a receiver including a local oscillator unit and a mixing circuit for heterodyning said radio waves with the output of said local oscillator unit, thereby to produce a plurality of intermediate frequency signals, an intermediate frequency amplifier tuned to pass preselected ones of said intermediate frequency signals and to reject all other intermediate frequency signals, a detector fed by said amplifier, and a seismic amplifier-recorder unit fed by said detector.

2. In a radio seismic system, a plurality of seismometers for converting seismic waves into electrical voltages representative thereof, a plurality of transmitters tuned to closely adjacent frequencies and connected to the respective seismometers to radiate radio waves modulated by said electrical voltages, and a receiver including a local oscillator unit for producing at least two signals of different frequencies, the frequency difference between said two signals being equal to the frequency difference between a preselected pair of the radio waves radiated by said transmitters, a mixing circuit for heterodyning said radio waves with said pair of local oscillator signals, thereby to produce a plurality of intermediate frequency signals having a common frequency, an intermediate frequency amplifier fed by said mixing circuit and tuned to said common frequency, a detector fed by said amplifier, and a seismic amplifier-recorder unit fed by said detector.

3. In a radio seismic system, a plurality of radio transmitter-seismometer units for radiating radio waves modulated by voltages representative of seismic waves, said radio waves having different but closely adjacent frequencies, a receiver including a plurality of local oscillators whose signals have a preselected frequency relationship to predetermined ones of said radio waves, a mixing circuit for heterodyning said radio waves with the output of all of said local oscillators to produce intermediate frequency signals, whereby certain of the intermediate frequency signals produced by the interaction of said predetermined radio waves with the outputs of the local oscillators have a common frequency, an intermediate frequency amplifier fed by said mixing circuit and tuned to said common frequency, a detector fed by said intermediate frequency amplifier, and a seismic amplifier-recorder unit fed by said detector.

4. In a radio seismic system, a plurality of radio transmitter-seismometer units for radiating radio waves modulated by voltages representative of seismic waves, said radio waves having different but closely adjacent frequencies with an equal frequency difference between adjoining radio waves in the frequency spectrum, a receiver including a plurality of local oscillators whose signals have a frequency difference which is an integral multiple of the frequency difference between adjoining radio waves, a mixing circuit for heterodyning said radio waves with the output of all of said local oscillators to produce intermediate frequency signals, thereby to produce several groups of intermediate frequency signals, the signals in each group having a common frequency, an intermediate frequency amplifier tuned to said common frequency, a detector fed by said intermediate frequency amplifier, and a seismic amplifier-recorder unit fed by said detector.

5. In a radio seismic system, a plurality of radio transmitter-seismometer units for radiating radio waves modulated by voltages representative of seismic waves, said radio waves having different but closely adjacent frequencies, with equal frequency differences between adjoining waves in the frequency spectrum, and a receiver including a pair of local oscillators, the frequency difference between the local oscillator signals being equal to the frequency difference between adjoining waves, a mixing circuit for heterodyning said radio waves with the output of all of said local oscillators to produce intermediate frequency signals, whereby a pair of intermediate frequency signals of a common and characteristic frequency is produced for each pair of adjoining waves, an intermediate frequency amplifier fed by said mixing circuit and tunable to said characteristic frequency, a detector fed by said intermediate frequency amplifier, and a seismic amplifier-recorder unit fed by said detector.

6. A receiver for a radio seismic system comprising, in combination, a radio frequency amplifier adapted to receive and amplify a plurality of modulated carrier waves of different frequencies, a plurality of local oscillators for producing signals of different frequencies, a mixing circuit for combining the output of all of said oscillators with the output of said radio frequency amplifier, an intermediate frequency amplifier fed by said mixing circuit, a detector fed by said intermediate frequency amplifier, and a seismic amplifier-recorder unit fed by said detector.

7. A receiver for a radio seismic system comprising, in combination, a radio frequency amplifier adapted to receive and amplify a plurality of modulated carrier waves of different frequencies, a plurality of local oscillators for producing signals of different frequencies, a mixing circuit for combining the output of all of said oscillators with the output of said radio frequency amplifier, a plurality of intermediate frequency amplifiers tuned to different frequencies, a coupling network for feeding a portion of the output of said mixing circuit to each of said intermediate frequency amplifiers, a detector fed by each of said intermediate frequency amplifiers, a seismic amplifier fed by each detector, and a common recorder unit for all of said seismic amplifiers.

8. A receiver for a radio seismic system comprising, in combination, a radio frequency amplifier adapted to receive and amplify signals of different frequencies, a plurality of local oscillators for generating signals of different frequencies, a mixing circuit for combining the output of all of said local oscillators with the output of said amplifier, and a plurality of tuned intermediate frequency amplifiers fed by said mixing circuit, the frequency of said local oscillators and said tuned amplifiers being variable to permit selection of a predetermined group of signals for each tuned amplifier, a detector fed by each intermediate frequency amplifier, a seismic amplifier fed by each detector, and a common recorder unit for all of said seismic amplifiers.

GLEN PETERSON.

References Cited in the file of this patent

UNITED STATES PATENTS

| Number | Name | Date |
| --- | --- | --- |
| 1,785,307 | Hammond | Dec. 16, 1930 |
| 2,265,513 | Burg | Dec. 9, 1941 |
| 2,348,409 | Parr | May 9, 1944 |
| 2,360,507 | Minton | Oct. 17, 1944 |
| 2,426,778 | Long | Sept. 2, 1947 |
| 2,449,391 | Kogane | Sept. 14, 1948 |
| 2,473,469 | Dahm | June 14, 1949 |
| 2,479,772 | Peterson | Aug. 23, 1949 |
| 2,494,370 | Swartzel | Jan. 10, 1950 |
| 2,599,064 | Minton | June 3, 1952 |